(12) United States Patent
Farquharson et al.

(10) Patent No.: US 7,370,075 B2
(45) Date of Patent: May 6, 2008

(54) METHOD AND APPARATUS FOR MANAGING WEB SERVICES WITHIN A COMPUTER NETWORK SYSTEM

(75) Inventors: Alistair John Farquharson, Los Angeles, CA (US); Eric Pulier, Santa Monica, CA (US)

(73) Assignee: Digital Evolution, Santa Monica, CA (US)

(*) Notice: Subject to any disclaimer, the term of this patent is extended or adjusted under 35 U.S.C. 154(b) by 830 days.

(21) Appl. No.: 10/423,534

(22) Filed: Apr. 24, 2003

(65) Prior Publication Data

US 2003/0208533 A1 Nov. 6, 2003

Related U.S. Application Data

(60) Provisional application No. 60/376,101, filed on Apr. 25, 2002.

(51) Int. Cl.
*G06F 15/16* (2006.01)
*G06F 9/00* (2006.01)

(52) U.S. Cl. ............ 709/203; 709/328; 709/219; 455/423

(58) Field of Classification Search ........ 709/203, 709/221–224, 238, 328; 455/418–425; 715/734; 345/440
See application file for complete search history.

(56) References Cited

U.S. PATENT DOCUMENTS 6,766,165 B2* 7/2004 Sharma et al. .......... 455/423
7,058,600 B1* 6/2006 Combar et al. .......... 705/34
7,069,318 B2* 6/2006 Burbeck et al. ......... 709/224
2003/0061404 A1* 3/2003 Atwal et al. ............ 709/328

* cited by examiner

*Primary Examiner*—Nathan Flynn
*Assistant Examiner*—Jude J Jean-Gilles
(74) *Attorney, Agent, or Firm*—O'Melveny & Myers LLP

(57) ABSTRACT

The present invention is directed to a method and apparatus that manages Web Services within an enterprise having an intranet. In an embodiment of the present invention, a Management Server (MS) is connected with a Management Server Client (MSC) via a network. The MS and MSC work in concert to manage Web Services by providing performance monitoring, security, contract and Service Level Agreement (SLA) management, and other performance enhancements in a unique, pluggable, expandable architecture. In another embodiment of the present invention, the MS is connected to an MSC via a network using a Web Services Application Programming Interface (API). The MSC is connected with a server for providing Web Services to a client. The Web Services are provided to the client through the MSC. The MS provides configuration data to the MSC for management of the Web Services provided through the MSC. In yet another embodiment, the MS is connected to a plurality of MSC's. Each MSC is connected with a plurality of servers. Each of the servers can provide Web Services to a plurality of clients. The Web Services are provided to each client through at least one MSC. In a further embodiment, the Web Services are provided to a client through an MSC that is connected to the server.

11 Claims, 8 Drawing Sheets

Relationship between the MS and MSC

Figure 1 – Enterprise Network Structure
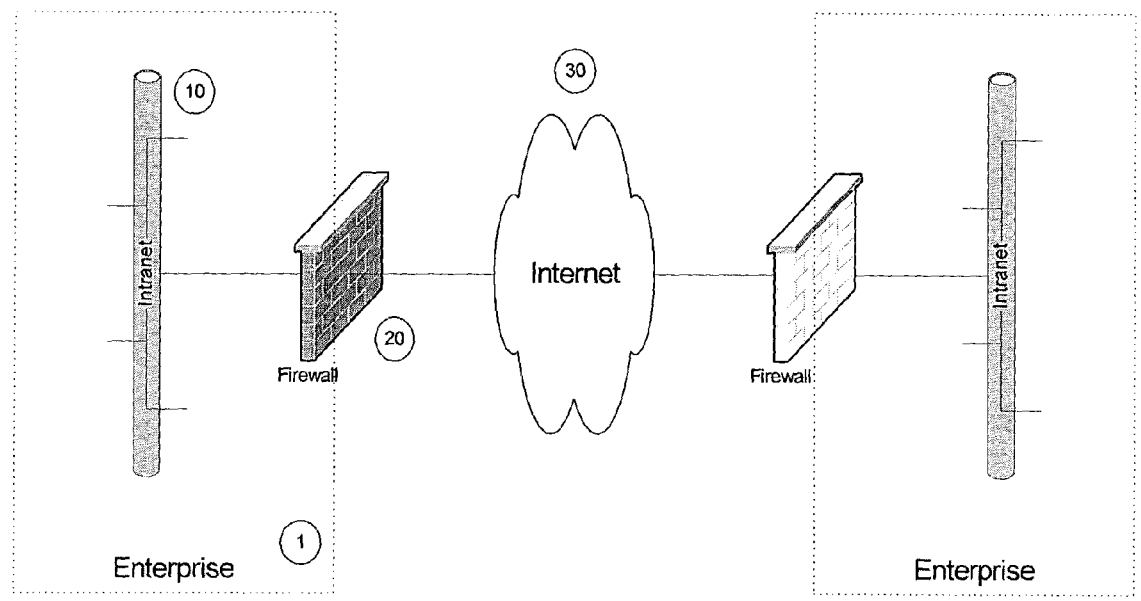
Figure 2 – Service Oriented Architecture
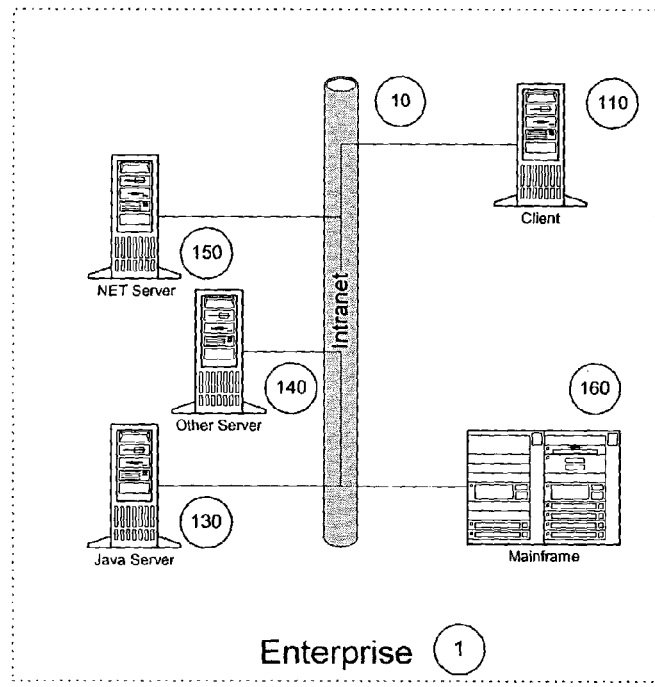

Figure 3 – Management of an SOA
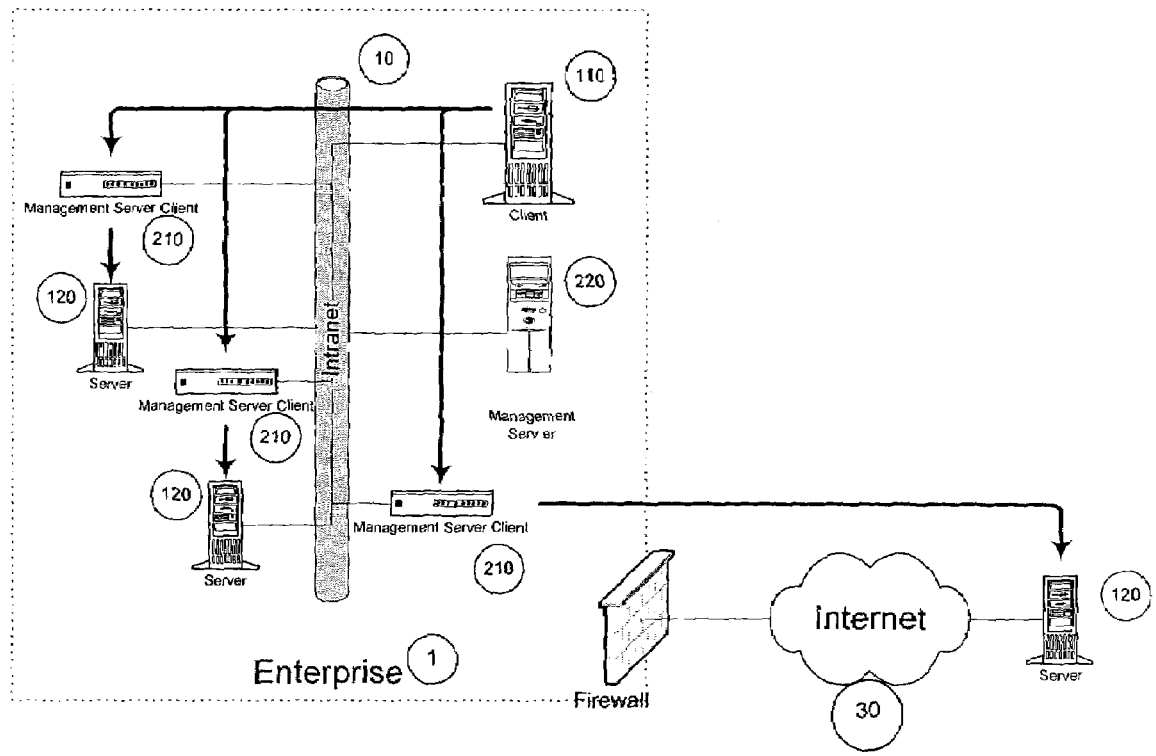
Figure 4 – Relationship between the MS and MSC
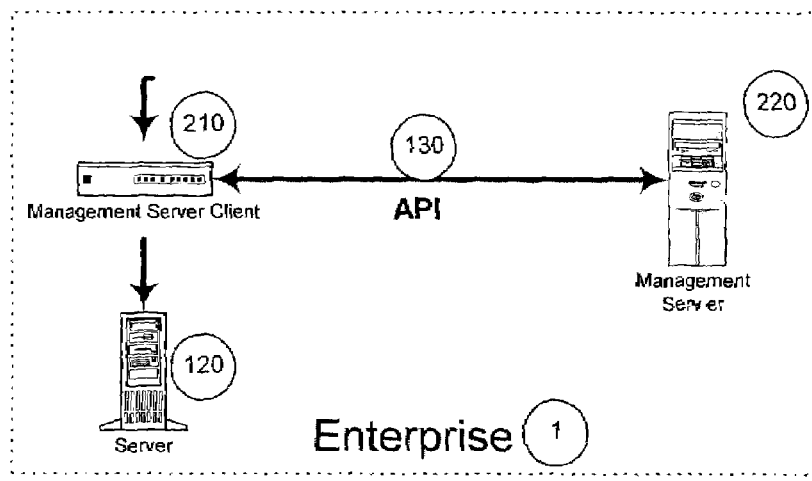

Figure 5 – Management Server Architecture
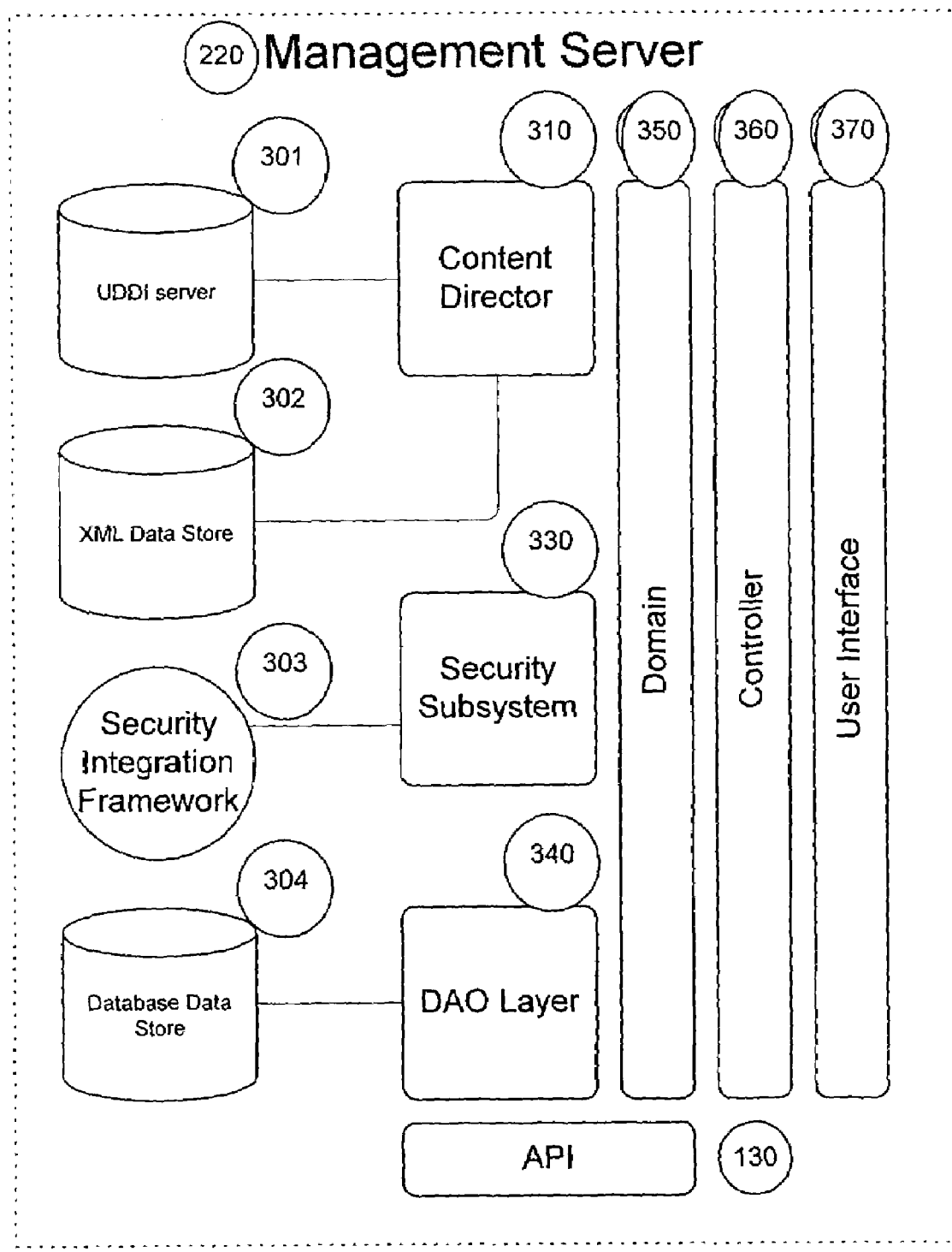

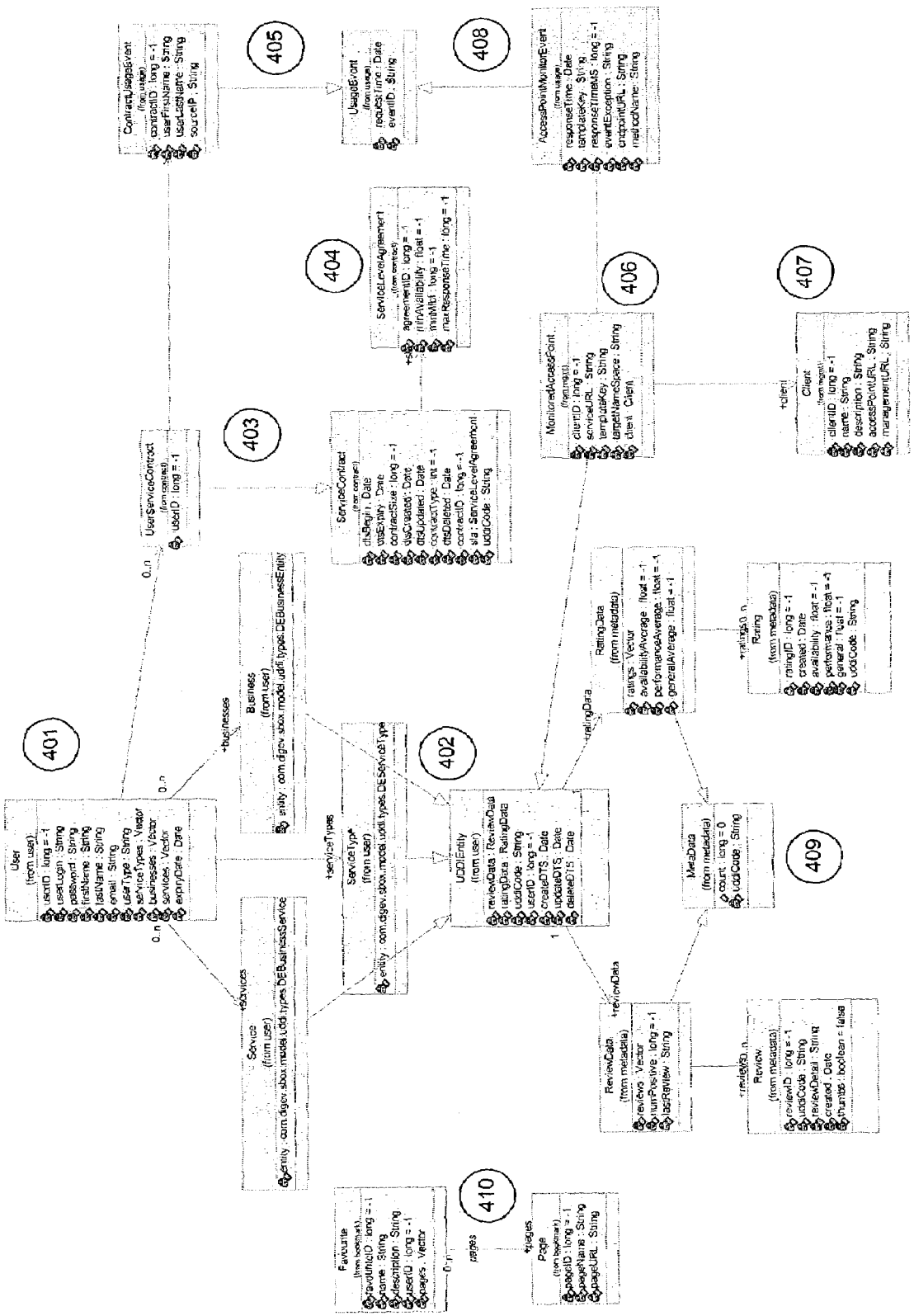
Figure 6 – Management Server Object Model

Figure 7 – Management Server Client Architecture
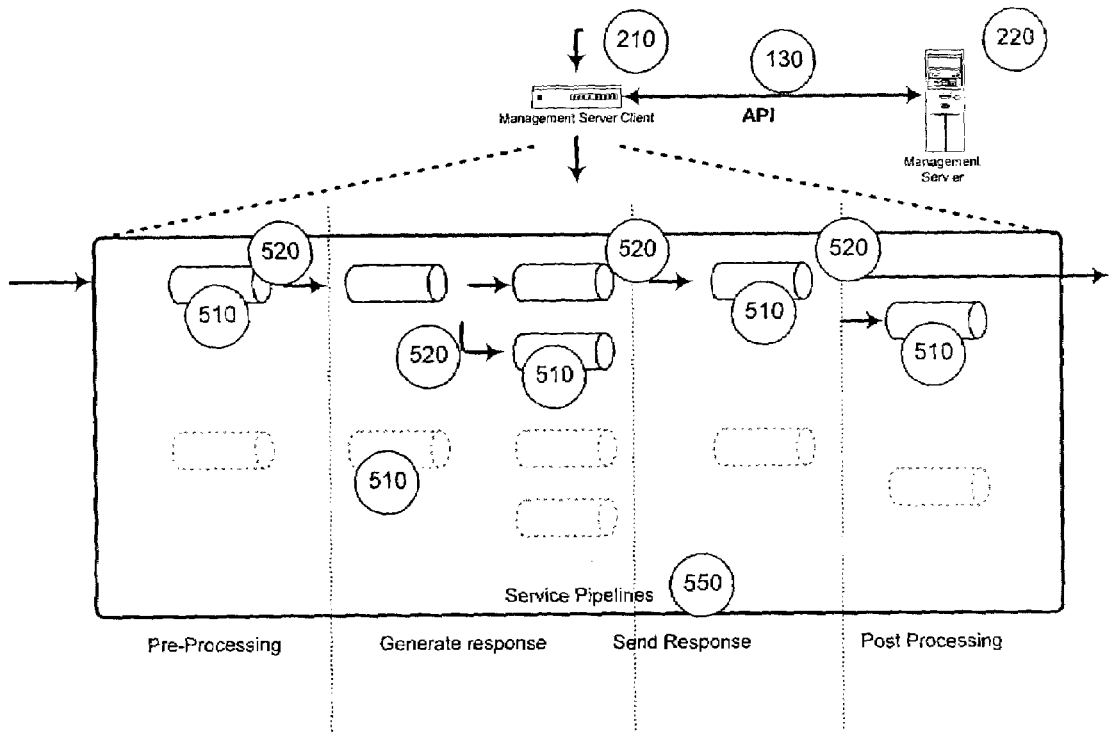
Figure 8 – Flow of UDDI/Meta-Data Process
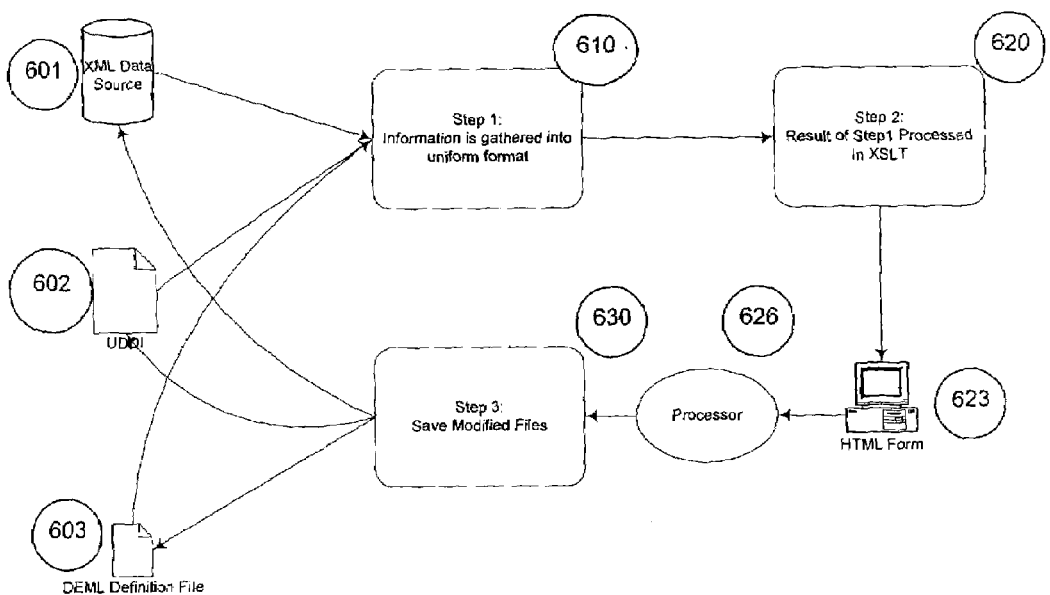

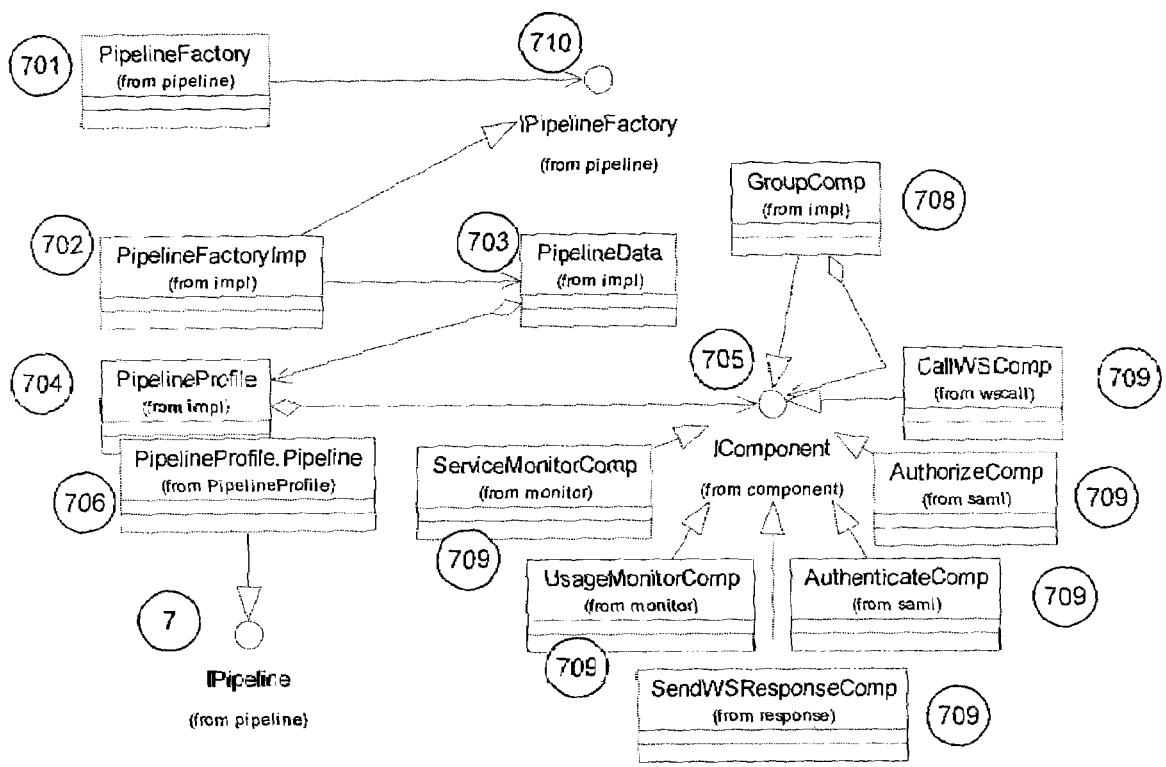
Figure 9 - Pipeline Framework Object Model

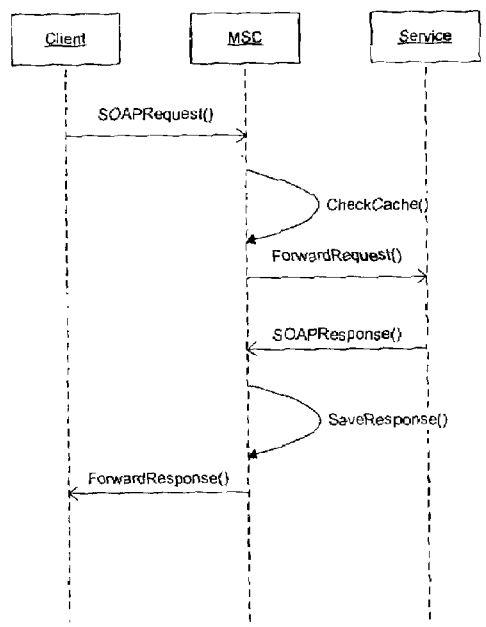
Figure 10a – Caching sequence diagram on if the SOAP Response to the SOAP Request is not in the cache.

Figure 10b – Caching sequence diagram on if the SOAP Response to the SOAP Request is in the cache.
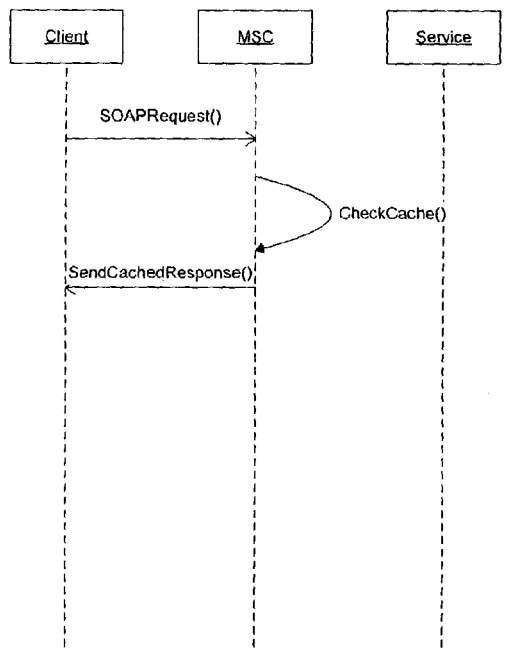

METHOD AND APPARATUS FOR MANAGING WEB SERVICES WITHIN A COMPUTER NETWORK SYSTEM

RELATED APPLICATION DATA

This application claims priority pursuant to 35 U.S.C. §119(e) to U.S. Provisional Application No. 60/376,101, filed Apr. 25, 2002, for Method And Apparatus For Managing Web Services Within A Computer Network System.

BACKGROUND OF THE INVENTION

1. Field of the Invention

The present invention relates to the field of a computer network system and, in particular, to a method and apparatus for managing Web Services within a network system.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

In general, a web is an unstructured network system that uses HyperText Transfer Protocol (HTTP) as its transaction protocol. The World Wide Web comprises all HTTP nodes on the public Internet. An internal web comprises all HTTP nodes on a private network, such as an enterprise's Local Area Network (LAN) or Wide Area Network (WAN). If the organization is a corporation, the internal web is also a corporate web.

Note that internal webs, also known as intranets, are only logically "internal" to an enterprise. Physically, they can span the globe as long as access is limited to a defined community of interest.

Web Services generally provide access to applications and data over the web through a platform independent, standards-based transport mechanism called Simple Object Access Protocol (SOAP). These services can describe themselves through an eXtensible Markup Language (XML) document formatted using the Web Services Description Language (WSDL).

Referring now to FIG. 1, the intranet 10 within an enterprise 1 are typically separated from the Internet 30 through a firewall 20. Basically, a firewall 20 is a barrier to keep destructive services on the public Internet 30 away from the intranet 10.

Referring now to FIG. 2, the machines on a service-orientated network can be categorized as two types: servers (130, 140, 150 and/or 160) and clients (110). Those machines that provide Web Services to other machines are servers (like Net servers 150, JAVA servers 130 or Mainframe servers 160); the machines that are used to connect to those services are clients 110. It is possible and common for a machine to be both a server and a client, but for purposes here the machines are referred to as one or the other.

Referring now to FIGS. 1 and 2, the advent of service-oriented network has provided an enterprise 1 the unprecedented ability to integrate with internal machines and externally provided services. However, this integration created problems for the enterprise 1 as to how to manage both these internal machines within the intranet 10 and the externally provided services (e.g., services on another intranet or the Internet). Current Service Oriented Architecture (SOA) has yet to develop an extensible and pluggable system to manage these machines and/or services, such as managing the security risk and/or the performance and availability of the services provided by the servers. Thus, there is a need for an enterprise 1 to develop a system to manage its SOA in an extensible and pluggable way.

SUMMARY OF THE INVENTION

The present invention is directed to a method and apparatus that manages Web Services within an enterprise having an intranet. In an embodiment of the present invention, a Management Server (MS) is connected with a Management Server Client (MSC) via a network. The MS and MSC work in concert to manage Web Services by providing performance monitoring, security, contract and Service Level Agreement (SLA) management, and other performance enhancements amongst other things with the enterprise in a unique, pluggable, expandable architecture.

In another embodiment of the present invention, the MS is connected to a MSC via a network using a Web Services Application Programming Interface (API). The MSC is connected with a server for providing Web Services to a client. The Web Services are provided to the client through the MSC. The MS provides configuration data to the MSC on how to manage the Web Services provided through the MSC.

In yet another embodiment, the MS is connected to a plurality of MSC's. Each MSC is connected with a plurality of servers. Each of the servers can provide Web Services to a plurality of clients. The Web Services are provided to each client through at least one MSC.

In a further embodiment, the Web Services from a server are provided to a client through a MSC that is connected to the server.

A more complete understanding of the present invention will be afforded to those skilled in the art, as well as realization of additional advantages and objects thereof, by a consideration of the following detailed description. References will be made to the appended sheets, which first will be described briefly.

BRIEF DESCRIPTION OF THE DRAWINGS

The drawings illustrate the design and utility of preferred embodiments of the invention. The components in the drawings are not necessarily to scale; instead emphasis is placed upon illustrating the principles underlying the embodiment. Moreover, in the drawings like reference numerals designate corresponding parts throughout the different view.

FIG. 1 is a diagram illustrating an enterprise's internal network (intranet) in which the present invention can be employed.

FIG. 2 is a diagram illustrating a typical SOA within an enterprise's internal network (intranet). The Web Services offered by the servers are made available to clients on the network (either within the intranet or with a partner on the Internet). It must be noted that the differences between a client and server in this SOA are purely semantic. They need not be separate hardware platforms, nor do they need to be confined to particular roles as server or client. An application or platform can both consume and produce services without restriction.

FIG. 3 is a diagram illustrating a Management Server (MS) and a plurality of Management Server Clients (MSC's) in an enterprise's network according to the present invention.

FIG. 4 is a diagram illustrating an MS and an MSC connected via an Application Program Interface (API) according to the present invention.

FIG. 5 is a logical diagram detailing the architecture within the MS according to the present invention.

FIG. 6 is an object model of the MS showing the relationships between the entities within the MS according to the present invention.

FIG. 7 is a diagram illustrating a pipeline framework within an MSC according to the present invention.

FIG. 8 is a flow diagram illustrating the process by which Meta-Data and UDDI data are handled using the Content Director according to the present invention.

FIG. 9 is an object model of the MSC showing the relationships between the entities within the MSC according to the present invention.

FIG. 10*a* is a caching sequence diagram of the SOAP Response to the SOAP Request if the SOAP Response is not in the Caching Component according to the present invention.

FIG. 10*b* is a caching sequence diagram of the SOAP Response to the SOAP Request if the SOAP Response is in the Caching Component according to the present invention.

DETAILED DESCRIPTION OF THE INVENTION

The invention is a method and apparatus for managing Web Services within a network system of an enterprise and between enterprises. In the following description, numerous specific details are set forth to provide a more thorough description of embodiments of the invention. It should be apparent, however, to one skilled in the art that the invention may be practiced without these specific details. In other instances, well known features have not been described in detail so as not to obscure the invention.

Referring now to FIG. 3, in an embodiment of the present invention the Management Server (MS) 220 exists within an enterprise 1 and is connected to the intranet 10. The MS 220 is connected with a plurality of connected Management Server Clients (MSC's) 210 via the intranet 10. The MSC's 210 intercept Web Service calls from the client 110 to the servers 120. This allows the MS 220 to manage and collect statistics from the MSC's 210 that could potentially exist anywhere on either the intranet 10 or the Internet 30. In FIG. 3, the MSC's 210 are shown intercepting Web Service calls between the client 110 and the servers 120. The Web Service calls are shown conceptually and actually occur over intranet 10 and Internet 30.

Referring to FIG. 4, the MS 220 is connected to the MSC's 210 via the intranet 10 using a Web Services Application Programming Interface (API) 130. This API 130 is secured by allowing only licensed MSC's 210 to enter.

1. Management Server

In one embodiment, the Management Server (MS) allows an enterprise to manage its enterprise SOA. The MS contains features and functionality that are vital for the management of Web Services. For example, the MS should be Universal Description, Discovery and Integration (UDDI) Standards compliant. It should be customizable with Meta-Data Schemas to enhance the UDDI schema. It should be able to collect and display service performance and service availability statistics and have the ability to perform service ratings and reviews. It should have the ability to perform service contract management, service certification, service level agreement (SLA) management. The MS should also provide for enterprise security integration and service authentication and authorization, as well as provide the data for Management Server Client (MSC) and component pipeline configuration.

The Management Server (MS) is UDDI compliant. That is, the MS provides for the data schemas and interfaces laid out in the UDDI specification (e.g., the standard in the UDDI Version 2.0 specification).

UDDI is a registry that contains an industry-wide directory of Web Services. UDDI categorizes each service based on business, service and service type association for easy location by browsing or searching through the UDDI. Because UDDI is based on industry standards, it is a completely cross-platform device from which the large majority of the technical industry can benefit. Business is defined under the UDDI specification as a group that owns and maintains a particular Web Service within the UDDI. Service is defined as the particular Web Service that will be used by others. Service type is defined as a description of the type of service. For instance, "e-commerce" would be the service type for a "shopping cart" Web Service.

In one embodiment of the present invention, the Management Server is a system to provide for the management of a corporate SOA within the intranet. It does this through a plurality of Management Server Clients as shown in FIG. 3.

The Management Server also allows a user to customize UDDI Schema. The UDDI Schema is a published, open standard that specifies a way to store and search for Web Services within a SOA. The Management Server allows the user to customize the UDDI Schema while maintaining compliance with the standards.

In addition, referring now back to FIG. 3, the Management Server (MS) manages a contract between a server 120 and client 110, as well as associating a specified Service Level Agreement (SLA). The SLA specifies the quality of service that supports the contract and the MS manages the failure of the SLA and termination of the contract.

The Management Server is built using technology known to those skill in art, such as J2EE technology.

FIG. 5 shows the architecture of the Management Server (MS) at a logical component level. The MS 220 has three data stores; the UDDI Server 301, the XML Data Store 302 and the Database 303. These data stores are pre-existing and provide the data required for the presentation and management aspects of the MS functions. The UDDI Server 301 and XML Data Store 302 provide all the informational content regarding the businesses, services, and service types defined in the UDDI and registered in the MS. The Database 304 contains all other information regarding contracts, SLAs, users, Monitored Access Points (MOA's) and all other performance and management data for the MS and MSC.

The Content Director 310 is used to combine data from the XML Data Store 302 and the UDDI Server 301 in a format that allows the user to modify the data stored while maintaining the UDDI compliance of a sub-set of the data.

The Security Integration Framework 303 is built using technology known to those skilled in art, such as the technology available from the Java Specification called Java Authentication Authorization Services (JAAS). JAAS is used to connect the Management Server 220 to the intranet data sources through open standards. The Security Subsystem 330 then uses this data to securely authenticate the user when he/she logs onto the MS User Interface 370.

The Data Access Objects (DAO) Layer 340 is used to access data present in the database 304 and is built using technology and design patterns known to those skilled in the art. The Controller 360 and User Interface 370 present data to the user and control the user's interaction with the MS. The API 130 is the same API 130 shown in FIG. 4 and is used to manage and collect data from the MSC's for presentation to the user and storage in the Database 304.

FIG. 6 illustrates the domain object model for the Management Server 220 shown in FIG. 5. The domain object model shows in detail the relationships between the entities in the system. Referring now to FIG. 6, the User 401 has associated services, businesses and service types, which are all UDDI Entities 402. Essentially, this builds up the user's profile. Each UDDI Entity 402 has associated Meta Data 409 that could be ratings, reviews and any other meta information.

A User 401 also has Service Contracts 403 with specific Monitored Access Points 406, each of which is associated with a Service Level Agreement 404. The Monitored Access Points 406 are the network locations at which the services are made available. Each Monitored Access Point 406 has an associated Management Server Client 407 that is responsible for controlling access and managing the service from a server to a client.

There are two types of events in the MS, namely Contract Usage Events 405 and Access Point Monitor Events 408. These two types of events, respectively, record usage of Contracts 403 and Monitored Access Points 406.

A. Customizable UDDI Schema

Referring now to FIGS. 5 and 8, the Content Director 310 is used to combine data from the XML Data Store 302 and the UDDI Server 301 in a format, allowing the user to modify the data stored while maintaining UDDI compliance of a sub-set of the data.

The UDDI is an open, published standard; compliance with UDDI by the MS must be guaranteed while maintaining sufficient flexibility for the needs of an SOA within an enterprise. Referring now only to FIG. 8, in one embodiment of the present invention an XML document format known as Digital Evolution Markup Language (DEML) 603 was developed by the current inventive entity. The DEML 603 contains all the display properties for an HTML page. This, therefore, drives the presentation of the HTML form 623 and stores the attributes (not the data) for the custom fields that the user has defined. The Document Type Definition (DTD) for this document format is shown below:

---

DEML DTD Document

```
<?xml version="1.0" encoding="UCS-2"?>
<!ELEMENT Path EMPTY>
<!ATTLIST Path
    source CDATA #REQUIRED
    pathId CDATA #REQUIRED
    required CDATA #REQUIRED
    repeated CDATA #REQUIRED>
<!ELEMENT Paths (Path) * <
<!ELEMENT Label (Phrase) >
<!ELEMENT Attribute EMPTY>
<!ATTLIST Attribute
    name CDATA #REQUIRED
    value CDATA #REQUIRED>
<!ELEMENT Phase (#PCDATA) >
<!ATTLIST Phase language CDATA #REQUIRED>
<!ELEMENT Data (Phase) >
<!ATTLIST Data selected CDATA #REQUIRED>
<!ELEMENT DisplayProperties ( (Attribute) +,Data) >
<!ATTLIST DisplayProperties
    editable CDATA #REQUIRED
    type CDATA #REQUIRED>
<!ELEMENT Validation EMPTY>
```

---

-continued

DEML DTD Document

```
<!ATTLIST Validation required CDATA #REQUIRED>
<!ELEMENT Field (Paths, Label, DisplayProperties, Validation)>
<!ATTLIST Field
    xmltag CDATA #REQUIRED
    indexed CDATA #REQUIRED
    identifier CDATA #REQUIRED
    type CDATA #REQUIRED>
<!ELEMENT CatalogDefinition (Field) + >
```

---

And an example of an implementation of the above format on the XML document is shown below:

---

DEML XML Document

```
<Field xmltag="company" indexed="no"
identifier="no" type="attribute">
    <Paths>
        <Path source="uddi" pathId="XPATH to
        tag" required="yes" repeated="no"/>
        <Path source="uddi" pathId="/bindingDetailExt/binding
        Template/®comany"
required="yes" repeated="no"/>
    </Paths>
        <Label> <!-- Label in HTML form -->
            <Phrase language="English">Company</Phrase>
        </Label>
        <DisplayProperties editable="yes" type="textbox">
            <Attribute name="maxlength" value="255"/>
            <Attribute name="size" value="30"/>
            <Data selected="no">
                <Phrase language="English"/>
            </Data>
        </DisplayProperties>
        <Validation required="no"/>
    </Field>
[continued . . . ]
```

---

When the data is to be displayed in an HTML Form 623, it is collected from the UDDI 602 and XML Data Source 601. The data is processed along with the DEML file and combined into a combined format as shown below in step one 610:

---

Combined XML Document

```
<Field identitier="no" xmltag="company" type="attribute"
pathId="XPATH path to tag" indexed="no" source="uddi">
    <Label>
        <Phrase lanquage="English">company</Phrase>
    </Label>
    <DisplayProperties editable="yes" type="textbox">
        <Attribute name="maxlength" value="255"> </Attribute>
        <Attribute name="size" value="30"> </Attribute>
        <Data selected="no">
            <Phrase language="English">Company Name</Phrase>
        </Data>
    </DisplayProperties>
    <Validation> </Validation>
</Field>
```

---

This document is then transformed to HTML in step two 620 through the application of an eXtensible Style Language (XSL) transformation. The results of this transformation are displayed to the user 623. When the user updates any data or customizes the fields, this information is sent to a Processor 626 that extracts the data and saves (step three 630) the modified data to the XML Data Source 601 and/or the UDDI 602, as well as updates the DEML 603, if required.

The Customizable UDDI Schema of the Management Server (MS), while complex in design, is easy to use. In operation, the user is able to add data fields and content to the existing UDDI Schema display on the Management Server through a simple "Add Field" icon. The user is then led through a process of specifying the type and characteristics of the field. Once defined, the data field can then be populated with data and saved.

When the system saves the modified Schema, the UDDI data will be saved to the UDDI server and the custom data will be sent to the XML data store for later retrieval.

B. Contract and SLA Management

In one embodiment of the present invention, the MS is also used to create contracts and SLAs between users, roles or domains and Service Access Points. In order to create a contract, the following information must be submitted: 1) start date and time of the contract; 2) end date and time of the contract; 3) contract size (number of times the service may be called); and 4) regular expressions for domain, role and user parameters.

The following table shows some examples of the regular expression combinations that can be used to specify service users:

| Domain | Role | User | Who has access? |
|---|---|---|---|
| Mainframe | Administrator | * | All administrators on the mainframe |
| App1 | * | * | All users on the App1 system |
| * | * | CEO | CEO on all systems |
| * | * | * | All users |

The domain is the security domain within the enterprise that the user is authenticated against.

The MS and MSC can authenticate users against any of the systems to which it is connected.

In operation, users with sufficient access permissions can initiate a contract with a particular service by navigating to the desired access point, clicking on the icon and entering the contract parameters detailed previously. The MS manages the negotiation between the user and all related parties using a customizable workflow that can be set up by system administrators.

A Service Level Agreement (SLA) can also be associated with a contract that is used by the Management Server to notify the service users when the contracted service fails the terms of its SLA. This includes the following performance and availability parameters:

1) Response Time—this is the time that the service takes to respond to a particular query.
2) Mean Time Between Failure (MTBF)—this is the average time that a Service Access Point is running correctly between failures.
3) Availability—this is the percentage of time that the Service Access Point remains live over time.

If any of the above SLA parameters are not adhered to, then the users are alerted through the MS user interface.

2. Management Server Client

Referring now back to FIG. 3, the Management Server Client (MSC) 210 is placed between the target client 110 and the servers 120. MSC 210 can be deployed as a stand-alone component; or on the application server, router or firewall.

Referring now to FIG. 7, the Management Server Client 210 is essentially a pluggable pipeline architecture 550 that communicates with the Management Server 220 through a Web Services API 130. The Management Server 220 serves as a data store and management interface for control of the remote Management Server Client (or Clients) 210.

In one embodiment of the present invention, the Management Server Client is an intermediary designed for the management of an entire SOA in a scalable way. It does this by intercepting the Web Services calls made within the intranet.

Referring still to FIG. 7, the MSC 210 communicates with the MS 220 through a secure Web Services API 130. This API 130 secures communication and MSC licensing. In one embodiment, Service Component Pipeline Architecture 550 has a pluggable framework 520 in which Components 510 can be deployed for each of the managed Web Services. In another embodiment, the blueprints on building the framework 520 are deployed by the MS 220 to the MSC 210 via API 130. Thus, requiring no persistent storage on the Management Server Client 210. The individual components 510 of the MSC 210 are designed to fit in with the framework 520 and can perform many functions. Some of these functions are Caching, Authentication and Authorization.

A. Web Services API

The API is designed as a series of Web Services over the intranet that allow communication between the MS and MSC. The MSC gets its configuration from the Management Sever (MS). When starting, the MSC makes a Web Service Call to the MS over the API to retrieve the configuration.

Communication across the API is encrypted using the license key supplied with the MSC. This license key is coded to a specific MS and therefore enforces the licensing agreement. The MS will not communicate with more than one MSC with the same key; each key has a unique network location.

The MSC makes two types of calls to get all the pipeline configuration information. The first contains a list of all the Web Service Methods and the pipeline to which they are mapped. The other requests the details of a specific pipeline. Examples of the two are as follows.

Service Mapping XML

```
<?xml version="1.0" encoding="UTF-8"? >
<pipelines>
    <pipeline name="default-pipeline" lastModifed="2002/03/11
    05:22.23"
url="/intercept/DefaultPipeline" action="*" method"*" namespace="*" />
    <pipeline name="custom-pipeline". lastModifed="2002/03/11
    05:22.23"
url="/intercept/custom*"/>
    <pipeline name="default-pipeline" lastModifed=2002/03/11
    05:22.23" url="*"/>
</pipelines>
```

| Pipeline Configuration XML |
|---|

```xml
<?xml version="1.0" encoding="UTF-8"?>
<pipeline name="default-pipeline" lastModified="2002/3/11 05:22.23">
    <group type="pre-process" async_mode="synchronous">
        <component class="com.digev.msc.component.security.JaasSecurityComp"/>
    </group>
    <group type="generate-response" async_mode="synchronous">
        <component class="com.digev.msc.component.wscall.CallWSComp"/>
    </group>
    <group type="send-response" async_mode="synchronous">
        <component class="com.digev.msc.component.response.SendWSResponseComp"/>
    </group>
    <group type="post-process" async_mode="no-wait">
        <component class="com.digev.msc.component.monitor.ServiceMonitorComp"/>
        <component class="com.digev.msc.component.monitor.UsageMonitorComp"/>
    </group>
</pipeline>
```

The Service Mapping document uses regular expressions to map a particular service call to a specific pipeline name. The Pipeline Configuration document specifies all the components within the pipeline in the order in which they are called. The document also groups the components into separate group types according to function:

1) Pre-processing—All components related to security, and validation
2) Generate Response—All components related to transforming, processing and calling the Web Service
3) Send Response—All components related to handling the HTTP response back to the target client.
4) Post-processing—All components related to monitoring, which can be done asynchronously to the service call.

The Pipeline Configuration file (e.g., the blueprint on building the framework) is uploaded from the MS when the MSC is started. The MS provides a user interface whereby the user can graphically create a pipeline for a particular Access Point. The configuration is stored at the MS and uploaded to the MSC when required.

B. Pipeline Architecture

The Pipeline Architecture is designed to meet the following requirements:

1) Support API level integration as well as an intermediary server;
2) Be able to map Web Services method calls to pipelines;
3) Implement pluggable pipeline components; and
4) No local read/write persistent data storage at the MSC.

Referring to the object model in FIG. 9, the design of the core framework is known to those skilled in the art and uses a factory model to get the implementation. The intent here is to create a core framework definition that will change slowly, if at all, and glues together the Components 709 to the MSC implementation. All that is defined here is one factory, one data class, a servlet and a number of interfaces. These are described below:

PipelineFactory 701
 The pipeline factory encapsulates an instance of IPipelineFactory, which has only one method getPipeline( ). The PipelineFactory overloads the method with one signature that takes the generic HTTP request, response and servlet contest objects, and another that takes specific objects, such as the Digital Evolution (DE) specific HTTPAccessor object.

IPipelineFactory 710
 Defines the method for getting a pipeline instance given a request.
 public IPipeline getPipeline(HttpAccessor _accessor) throws GException;

IPipeline 707
 Defines the two execute methods and a getWSInfo method. One execute method execute the whole pipeline, while the other executes a section of it. The getWSInfo( ) method get the WSInfo object. The implementation of this class should be "statefull" since it contains a reference to the "statefull" WSInfo class.
 public void execute( ) throws GException;
 public void execute(String _sProcessStep) throws GException;
 public WSInfo getwSinfo( );

WSInfo
 This is the data class that contains the current state of the request and response objects. It exposes the basic request and response objects, as well as represents these objects by different toolkits. These toolkits include the DE Proprietary WSReqestObject and WSResponseObject, as well as the Apache Axis Project's MessageContext object. This will allow the user to integrate newer toolkits without breaking existing Components 709.

IComponent 705
 This interface contains an execute and an initialization methods. Instances of implementations of this should have initialization called once, then maintain this state and allow for the execute to be called free threaded.

Interceptor
 This servlet (i.e., program written in a platform independent programming language, that runs on a server) is only for the MSC exposed to HTTP. Its implementation gets a pipeline from the factory and then executes the pipeline.

PipelineFactorImp 702
 This class provides an implementation of IPipelineFactory. This class has two main functions, finding the pipeline to handle an incoming request and initializing and updating the pipelines. To find a pipeline, the PipelineFactoryImp iterates through all the PipelineProfiles, calling the PipelineProfile to see if it can handle the given request. When it gets an affirmative response, then it requests an instance of IPipeline from the PipelineProfile. All of the pipeline information is contained in the PipelineData class so that this class can build up the new configuration while running the old and replace the old with the new. This prevents the data for the pipeline from ever being in a transitory state.

PipelineData 703

The pipeline data class is just a data class for the pipeline information. Besides holding the list of pipelines, it also holds a hash of the components to facilitate reuse.

Component. FIG. 10b shows the sequence if the SOAP Response to the SOAP Request is stored in the Caching Component.

The Management Server allows the user to configure caching for each method call for a particular Web Service. An example of how the user can enable/disable caching and perform a simple timeout mechanism (TTL) is shown below:

Service Methods Caching Detail:

| Method Name | Refresh Frequency (ms) | | |
|---|---|---|---|
| getUser | Not Cashed | ↠UPDATE | ↠DO NOT CACHE |
| getUserBySoap | 10000 | ↠UPDATE | ↠DO NOT CACHE |

IPipelineConstants
This interface defines constants used by multiple MSC classes.
PipelineProfile 704
This class holds the set of IComponents associated with a pipeline. It has an inner class Pipeline that implements the IPipeline Interface. The PipelineProfile class performs two functions: it determines whether a given request, as represented by a WSInfo data object, should be served by this pipeline configuration. Then, when a request needs to be processed with this pipeline profile, the PipelineProfile class creates an instance of the inner class, providing the inner class the WSInfo data object.
PipelineProfile.Pipeline 705
This class holds the state of the request that is being processed, plus a system for sharing data between pipeline components. This provides methods to execute the whole pipeline or just a sub-section of the pipeline.
GroupComp 708
The group component provides a way to group components that have some commonalities in how they need to be executed. These commonalities can be from the step where they need to be executed to the node where they need to be executed.
Pipeline Componets 709
These components are examples of some of the types of components that can be inserted into the pipeline.
PipelineUtil
This class provides pipeline utility functions. It can map the human readable textual representation of the pipeline group type to the corresponding index.

In operation, when designing a new Pipeline Component for the framework, the developer must implement the IComponent interface. This is the only restriction that the architecture places on the design of new Pipeline Components. In order to load the Component, the developer would then list the Pipeline Component's class name in the Pipeline Configuration XML document that is uploaded to the MSC on startup.

C. Caching Component

One of the Pipeline Components built for the Management Server Client (MSC) is a Web Service Caching Component. This component caches the Simple Object Access Protocol (SOAP) Responses for a particular SOAP Request and returns that SOAP Response to a client within a specified Time-To-Live (TTL) period.

FIG. 10a is a caching sequence diagram on the SOAP Response to the SOAP Request if it is not in the Caching Due to the fact that certain preferred MSC embodiments operate without any persistent data storage, the pipeline component is configured by means of a service call to the Management Server. The Management Server keeps a record of the cache configurations for each service and method.

In one embodiment, the Cache Pipeline Component reads the SOAP Request and is discerning enough to recognize the parameters passed in the service call, ignoring all other information that would not affect the SOAP Response data. This method signature and data is compared to previous method calls stored in the Cache and, if found, the appropriate SOAP response is sent.

In another embodiment, the Cache Pipeline Component: 1) reads a SOAP Request; 2) decides which parameters in the SOAP Request would affect a SOAP Response; 3) ignores the parameters that would not affect the SOAP Response; and 4) compares whether parameters that would effect the SOAP Response ("effective parameters") are the same as the parameters stored in the Cache Pipeline Component ("cached parameters"). If the effective parameters are the same as the cached parameters, the Cache Pipeline Component sends SOAP Response data stored in the Cache Pipeline Component ("cache response data"). The cache response data corresponds to the cached parameters. If the effective parameters are not the same as the cached parameters, the Cache Pipeline Component forwards the effective parameters to a server to generate SOAP Response data for the effective parameters ("server response data"). After the Cache Pipeline Component receives the server response data, the server response data and the effective parameters are saved in the Cache Pipeline Component. The saved effective parameters can now be used as new cached parameters ("the new cached parameters"). The saved server response data can now be used as a new cache response data for future SOAP Requests that have the same parameters as the new cached parameters.

In operation, the Caching Component is enabled through the Access Point Management functionality present on the MS. The timeout can be set along with the ability to disable it for each individual method call.

D. Authorization Component

The SOAP Message is comprised of two parts: the SOAP Header and SOAP Body. The SOAP Header is typically used to pass additional information along with the SOAP Message that is not part of the actual Service call, including information such as security assertions.

Security Assertions are records of previous Authentication or Authorization events that have occurred during the course of a user's transaction. A standard has been presented to the W3C standards organization called Security Assertions Markup Language (SAML). When a Service call is made by the Client to the Server, the user's authentication assertion must be present in the SOAP Header in the form of a SAML document.

The Authorization Pipeline Component is used to authorize a user's access to a particular service based on the Contract registered in the MS. The pipeline component makes a call to the Management Server and passes the Authentication Assertion present in the SAML document. The MS uses this information to locate a Service Contract and, if it is found to be valid, returns an Authorization assertion to the MSC.

Referring now back to FIG. 3, the Authorization Component, in operation, is implicit on the contract between the client 110 and servers 120. This is covered in detail under the Management Server—Contract and SLA Management described above.

Having thus described embodiments of the present invention, it should be apparent to those skilled in the art that certain advantages of the within system have been achieved. It should also be appreciated that various modifications, adaptations, and alternative embodiments thereof may be made within the scope and spirit of the present invention. For example, Web Services within an enterprise's intranet have been illustrated, but it should be apparent that the inventive concepts described above would be equally applicable to other types of network systems. The invention is further supported by the following examples.

In one example, a client/server computer system comprises a client, a server for providing services to the client, and a Management Server Client (MSC) connected with the server. The services are provided to the client via the MSC. The client/server computer system also has an API and a Management Server (MS) connected with the MSC via the API. The MS provides configuration data to the MSC and upon receiving the configuration data via the API, the MSC manages the services provided from the server to the client. In another example, the MSC uses a pipeline to manage the services provided from the server to the client. In a further example, the pipeline comprises a plurality of components. In yet another example, the configuration data comprises a blueprint for utilizing the components to build the pipeline within the MSC.

What is claimed:

1. A client and server computer system, the system comprising:
   a network;
   a client connected with said network;
   a server connected with said client via said network;
   a Management Server Client (MSC) connected with said server;
   an Application Programming Interface (API) for allowing access only to licensed MSC's;
   a Management Server (MS) connected with said MSC via said API, said MS providing configuration data to said MSC; and
   a pipeline within said MSC and wherein said MSC uses said pipeline to manage said services provided from said server to said client, said pipeline comprising a plurality of components, said plurality of components comprising a caching component for caching a service from said server;
   wherein said client sends requests for services from said server to said client;
   wherein said MSC intercepts said requests for said services from said server to said client;
   wherein said services are provided to said client via said MSC;
   wherein upon receiving said configuration data via said API, said MSC manages services provided from said server to said client;
   wherein said caching component is configured to read a Simple Object Access Protocol (SOAP) request from said client, to decide which parameters in said SOAP Request from said client would affect a SOAP response from said server, to ignore parameters in said SOAP request from said client that would not affect said SOAP response, and to compare whether said parameters from said client that would effect said SOAP response are equivalent to parameters stored in said caching component.

2. The system of claim 1, wherein said caching component sends a SOAP response stored in said caching component if said parameters from said client that would effect said SOAP response are equivalent to said parameters stored in said caching component.

3. The system of claim 1, wherein said caching component forwards said parameters from said client that would effect said SOAP response to said server to generate said SOAP response if said parameters from said client that would effect said SOAP response are not equivalent to said parameters stored in said caching component.

4. A client and server computer system, the system comprising:
   a network;
   a client connected with the network;
   a server connected with the client via the network, the client adapted to send requests for services from the server to the client;
   a Management Server Client (MSC) connected with the server, the MSC adapted to intercept the requests for the services from the server to the client, the services being provided to the client via the MSC; and
   a pipeline within the MSC used by the MSC to manage the services provided from the server to the client, the pipeline comprising a caching component for caching a service from said server;
   wherein the caching component is configured to read a Simple Object Access Protocol (SOAP) request from the client, to decide which parameters in the SOAP Request from the client would affect a SOAP response from the server, to ignore parameters in the SOAP request from the client that would not affect the SOAP response, and to compare whether the parameters from the client that would effect the SOAP response are equivalent to parameters stored in the caching component.

5. The system of claim 4, further comprising an Application Programming Interface (API) for allowing access only to licensed MSC's.

6. The system of claim 5, further comprising a Management Server (MS) connected with the MSC via the API, the MS adapted to provide configuration data to the MSC, wherein upon receiving the configuration data via the API, the MSC manages services provided from the server to the client.

7. The system of claim 4, wherein the caching component sends a SOAP response stored in the caching component if the parameters from the client that would effect the SOAP response are equivalent to the parameters stored in the caching component.

8. The system of claim 4, wherein the caching component forwards the parameters from the client that would effect the SOAP response to the server to generate the SOAP response if the parameters from the client that would effect the SOAP response are not equivalent to the parameters stored in the caching component.

9. A network system for managing services provided from first and second plurality of servers to a client, the system comprising:
- an Application Programming Interface (API);
- a first Management Server Client (MSC) connected with said first plurality of servers a second MSC connected with said second plurality of servers;
- a Management Server (MS) connected with said first and second MSc's; and
- a pipeline used by at least one of the first and second MSc's to manage the services provided from the corresponding first or second server to the client, the pipeline comprising a caching component for caching a service from the server;
- wherein said first and second MSc's are licensed MSc's;
- wherein said API only allows access to licensed MSc's;
- wherein said MS provides configuration data to said first and second MSc's via said API;
- wherein upon receiving said configuration data via said API, said first MSC manages services provided from said first plurality of servers to said client and said second MSC manages services provided from said second plurality of servers server to said client; and
- wherein the caching component is configured to read a Simple Object Access Protocol (SOAP) request from the client, to decide which parameters in the SOAP Request from the client would affect a SOAP response from the server, to ignore parameters in the SOAP request from the client that would not affect the SOAP response, and to compare whether the parameters from the client that would effect the SOAP response are equivalent to parameters stored in the caching component.

10. The system of claim 9, wherein the caching component sends a SOAP response stored in the caching component if the parameters from the client that would effect the SOAP response are equivalent to the parameters stored in the caching component.

11. The system of claim 9, wherein the caching component forwards the parameters from the client that would effect the SOAP response to the server to generate the SOAP response if the parameters from the client that would effect the SOAP response are not equivalent to the parameters stored in the caching component.

* * * * *